United States Patent
Sakai

(10) Patent No.: US 10,378,872 B2
(45) Date of Patent: Aug. 13, 2019

(54) MEASURING METHOD AND DEVICE OF MACHINE ACCURACY IN MACHINE TOOL

(71) Applicant: NAKAMURA-TOME PRECISION INDUSTRY CO., LTD., Hakusan-shi, Ishikawa (JP)

(72) Inventor: Tomoki Sakai, Hakusan (JP)

(73) Assignee: NAKAMURA-TOME PRECISION INDUSTRY CO., LTD., Hakusan-Shi, Ishikawa (JP)

( * ) Notice: Subject to any disclaimer, the term of this patent is extended or adjusted under 35 U.S.C. 154(b) by 136 days.

(21) Appl. No.: 15/451,439

(22) Filed: Mar. 7, 2017

(65) Prior Publication Data

US 2017/0254630 A1    Sep. 7, 2017

(30) Foreign Application Priority Data

Mar. 7, 2016  (JP) ................................. 2016-043336

(51) Int. Cl.
*B23Q 17/00* (2006.01)
*G01B 21/04* (2006.01)
*G01B 5/012* (2006.01)

(52) U.S. Cl.
CPC .............. *G01B 5/012* (2013.01); *B23Q 17/00* (2013.01); *G01B 21/042* (2013.01); *B23Q 2017/001* (2013.01); *B23Q 2717/006* (2013.01)

(58) Field of Classification Search
CPC ...... G01B 5/012; G01B 21/042; B23Q 17/00; B23Q 2017/001; B23Q 2717/006
USPC ... 33/502–503, 550–551, 553–554, 556–557
See application file for complete search history.

(56) References Cited

U.S. PATENT DOCUMENTS

| | | | | |
|---|---|---|---|---|
| 5,665,896 A * | 9/1997 | McMurtry | ........... | G01B 21/042 73/1.75 |
| 6,886,264 B2 * | 5/2005 | Sakata | ..................... | G01B 7/12 33/502 |
| 7,283,889 B2 * | 10/2007 | Otsuki | ................. | G05B 19/404 700/186 |
| 7,460,970 B2 * | 12/2008 | Madlener | ............. | G01B 21/042 702/94 |
| 7,676,942 B2 * | 3/2010 | Jordil | ..................... | G01B 5/008 33/503 |

(Continued)

OTHER PUBLICATIONS

European Search Report in corresponding European Application No. 17159589 dated Jul. 11, 2017.

*Primary Examiner* — Justin Seo
*Assistant Examiner* — Tania C Courson
(74) *Attorney, Agent, or Firm* — Bacon & Thomas, PLLC

(57) ABSTRACT

A method and a device can measure machine error of an axis of rotation in a tool post having a touch probe without restriction of an angular range of an angle of rotation. Directions of a measurement plane and a measurement axis in a five-axis measurement are switched in correspondence to a range of the angle of rotation in a touch probe. The five-axis measurement is carried out by setting a position in a direction of a measurement axis in a measurement plane to a position where a reference sphere does not interfere with a lever rod of the touch probe as occasion demands. The five-axis measurement is carried out, for example, by setting the measurement plane to a position which is perpendicular to a line connecting an estimated center of the reference sphere and a center of a tip sphere or the lever rod of the touch probe.

8 Claims, 7 Drawing Sheets

(56) References Cited

U.S. PATENT DOCUMENTS

| | | | | |
|---|---|---|---|---|
| 7,941,240 B2* | 5/2011 | Katoh | ................... | G05B 19/404 |
| | | | | 700/191 |
| 8,140,178 B2* | 3/2012 | Hon | ..................... | G01B 5/20 |
| | | | | 310/90.5 |
| 8,336,219 B2* | 12/2012 | Grzesiak | .............. | G01B 21/042 |
| | | | | 33/502 |
| 8,635,783 B2* | 1/2014 | McDonnell | ............ | G01B 5/008 |
| | | | | 33/502 |
| 8,860,795 B2* | 10/2014 | Suzuki | ............... | G06K 9/00221 |
| | | | | 348/77 |
| 9,002,502 B2* | 4/2015 | Matsushita | .......... | B23Q 1/5406 |
| | | | | 318/569 |
| 9,506,736 B2* | 11/2016 | Oki | ..................... | G01B 5/008 |
| 9,863,766 B2* | 1/2018 | Wallace | ............... | G01B 21/042 |
| 2006/0235636 A1 | 10/2006 | Madlener et al. | | |
| 2008/0114485 A1 | 5/2008 | Katoh et al. | | |
| 2015/0292852 A1 | 10/2015 | Oki | | |

\* cited by examiner

MEASURING METHOD AND DEVICE OF MACHINE ACCURACY IN MACHINE TOOL

TECHNICAL FIELD

The invention relates to a measuring method and a measuring device of a machine accuracy (an error to be calibrated, hereinafter refer also to as "machine error") in a machine tool, and more particularly to a method and a device which are used for measuring a deviation in an axis of rotation according to a five-axis geometrical error measuring method (hereinafter, refer to as "five-axis measuring method"), for example, in a machine having a multiaxial structure which is provided with three linear axes and two rotational axes.

BACKGROUND ART

A shape of a work is complicated in recent years in a machining of a machine tool, and the machining on the basis of a five-axis simultaneous control is going to be carried out for the purpose of shortening a machining time and improving a machining accuracy. In the case that the number of the machining axes which are controlled simultaneously is increased, an error called generally a geometric error, for example, an inclination between two axes and a deviation of a center position in a pivot shaft becomes a subject of discussion, and there is generated needs for measuring a machine error of a finished machine tool at a higher accuracy.

FIG. 8 is a view schematically showing an example which measures a deviation of a center position in a pivot shaft of a table 42 in a machining center by using a five-axis measuring method. A reference sphere 2 is fixed to an outer peripheral portion of the table 42, and a touch probe 1 is installed to a tool shaft 41 which is provided in a tool post 43. Further, a central coordinate of the reference sphere 2 is determined by bringing the touch probe 1 into contact with the reference sphere 2 from five directions at positions where the table 42 is rotated at every predetermined angle (for example, five degrees).

In the machining center, a rotating movement of the table 42 is generally generated by a C direction (around a Z-axis), and an upper surface of the table 42 is an X-Y plane. Five directions in this case are constituted by −Y, +Y, −X, +X and +Z directions (refer to FIG. 8).

In the case that the touch probe 1 is installed to the tool post 43 in such a manner that a lever rod 12 extends in a direction of the Z-axis, a tip sphere 11 of the touch probe can be brought into contact with the positions in five directions shown in FIG. 9 whichever position the table 42 rotates to.

A measurement program for measuring a central coordinate of a reference sphere by bringing a touch probe into contact with a reference sphere according to the procedure mentioned above and arithmetically operating a machine error on the basis of the measured value has been provided, for example, by a manufacture of the touch probe, and has been conventionally used for measuring a machine accuracy of a machining center.

SUMMARY OF THE INVENTION

Problem to be Solved by the Invention

In the case that the measuring method of the machine accuracy mentioned above which is used in the machining center is intended to be used for an accuracy measurement of an angle of rotation around a B axis in a lathe (a composite lathe) having a tool post which can rotate around the B axis, there is generated a problem that a range is restricted in a measurable angle of rotation.

More specifically, in the measurement of the B axis in the lathe, the lever rod 12 of the touch probe comes into contact with the reference sphere 2 before the tip sphere 11 of the touch probe is in contact with the reference sphere 2 as shown in FIG. 6, when the angle of rotation goes beyond about 40 degrees, according to a magnitude of the tip sphere 11 of the touch probe or the reference sphere, and the measurement can not achieved.

More specifically, in the case that the touch probe rotates together with the rotating movement of the tool post which is intended to be measured an accuracy of an angle of rotation, it has been impossible to carry out an automatic measurement of a machine accuracy which has been carried out in the machining center using the measurement program provided by the manufacture of the touch probe.

Further, there is thought a method of determining a center of the reference sphere by an estimation from a measured value in a measurable range in an immeasurable angular range, however, there has been a problem that a measurement accuracy is widely lowered in the method mentioned above.

The invention aims at solving the problem as mentioned above and providing a method and a device which can measure a machine error of an axis of rotation in a tool post to which a touch probe is installed at a high accuracy which is not restricted by an angular range in an angle of rotation.

Means for Solving Problem

In this invention, directions of a measurement plane P (Pa, Pb) and a measurement axis A (Aa, Ab) in a five-axis measurement are switched in correspondence to a range of an angle or rotation θ of a touch probe 1. Further, a five-axis measurement is carried out by setting a position of the measurement plane P in the direction of the measurement axis A to a position where the reference sphere 2 and a lever rod 12 of the touch probe 1 do not interfere, as occasion demands. For example, the five-axis measurement is carried out by setting the measurement plane P to a position so that a line which connects an estimated center O of the reference sphere 2 and a center Q of the tip sphere 11 is perpendicular to the lever rod 12 of the touch probe.

More specifically, the invention solves the problem mentioned above by carrying out the automatic measurement at the position where the lever rod 12 of the touch probe and the reference sphere 2 do not interfere and the measuring method corresponding to the angle range of the angle of inclination θ, in correspondence to the angle of inclination θ from the reference direction of the touch probe 1 at the measuring time.

A device for measuring a machine accuracy in a machine tool according to the invention is a device which is generally constructed by a software and is provided for measuring a displacement of an axis of rotation in a tool post 3 by detecting the reference sphere 2 installed at a predetermined position by means of the touch probe 1 which is installed to the rotatable tool post 3.

The measuring device according to the invention is provided with a first measuring means 4a which measures a center position of the reference sphere 2 at an angular range which is near a rotating movement starting point angle of the tool post 3 according to a five-axis measuring method, a second measuring means 4b which measures the center position of the reference sphere 2 according to the five-axis measuring method by setting a plane including a first measurement axis Aa which is orthogonal to a first measurement plane Pa used in the first measuring means 4a and one axis of the first measurement plane Pa to a second measurement plane Pb and setting an axis which is orthogonal to the second measurement plane to a second measurement axis Ab, and a switching means S (refer to FIG. 7) which switches the first measuring means 4a and the second measuring means 4b at a predetermined angular position of the angle of rotation in the tool post 3.

According to the device mentioned above, since the measuring method is switched in correspondence to the angle of rotation θ in the tool post 3, the range of measurement is not restricted, and it is possible to measure with a high accuracy over a wide angular range.

In the case that a radius r of the tip sphere 1 of the touch probe 1 is smaller than a radius R of the reference sphere 2, there may occur such a matter that the lever rod 12 of the touch probe comes into contact with the reference sphere 2 before the tip sphere 11 of the touch probe is in contact with the reference sphere 2 in any one or both of the first measuring means 4a and the second measuring means 4b, and the measurement according to the five-axis measuring method can not be achieved. The problem can be avoided by provision of a measurement plane moving means 5 (5a, 5b) which moves the measurement plane P in a direction of the measurement axis A at a position where the lever rod 12 of the touch probe and the reference sphere 2 do not come into contact with each other.

The measurement plane moving means 5 which is the simplest and most secure is a means which sets the measurement plane P to a plane moving at (R+r)sin θ in the direction of the measurement axis A from a plane P0 (P0a, P0b) where the center of the reference sphere 2 is estimated to be positioned. More specifically, the center O of the reference sphere 2 can be detected without generation of the interference with the lever rod 12 by measuring at a position where a straight line connecting the center 0 of the reference sphere 2 and the center Q of the tip sphere 11 of the touch probe is perpendicular to the lever rod 12 of the touch probe.

The measuring device according to the invention can be preferably used particularly for measuring the machine accuracy in the B-axis rotating movement of the tool post 3 in the lathe having the tool post 3 which can rotate around the B axis.

Effect of the Invention

In the invention, the measuring direction of the reference sphere is automatically selected in correspondence to the angle of the touch probe at the measuring time, and the measuring position of the reference sphere is set to the position where the lever rod of the touch probe and the reference sphere do not interfere as occasion demands. As a result, the five-axis measurement of the reference sphere can be achieved at all the angles of the touch probe, and an instrumental accuracy, that is, a calibrating accuracy of the machine is improved.

According to the invention, there is an effect that the automatic measurement of the machine accuracy can be achieved with the technically stable and high accuracy in the measurement of the machine error using the pivot shaft, for example, the accuracy measurement of the displacement in the axis of rotation of the table which has been actually performed in the machining center can be applied to the accuracy measurement of the displacement in the axis of rotation of the tool post in the lathe.

MODES FOR CARRYING OUT THE INVENTION

Figure 1:
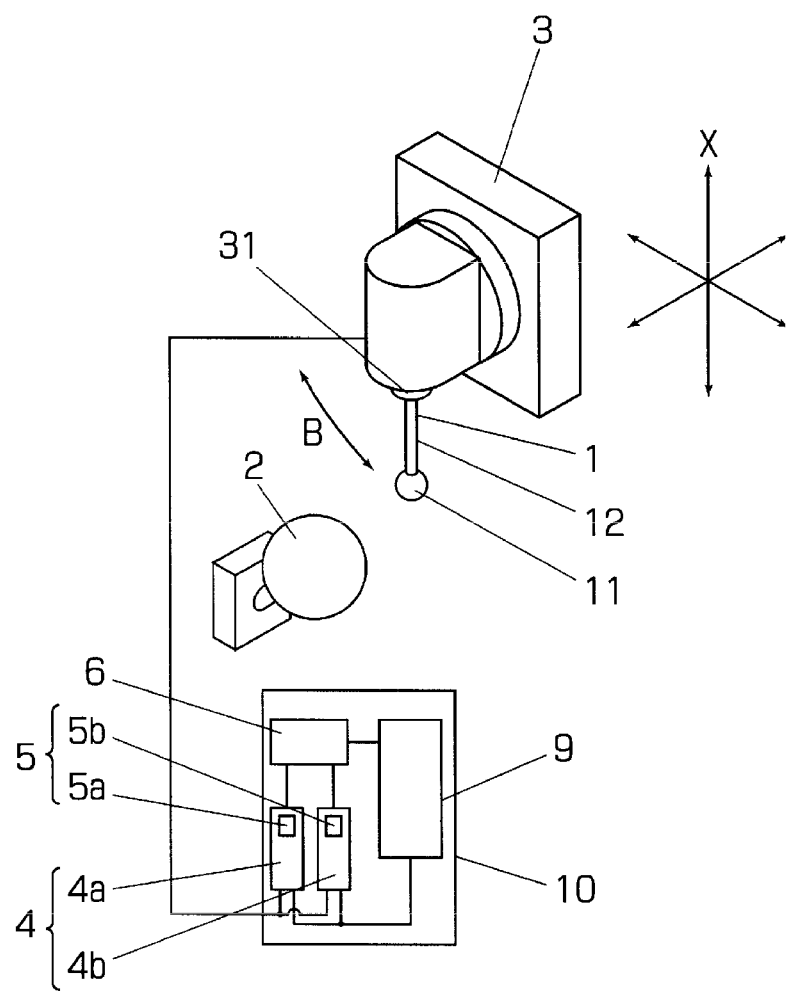
FIG. 1 is a perspective view schematically showing a state of measuring a machine accuracy of a B-axis rotating movement in a lathe.

A description will be given below of an embodiment according to the invention with reference to the accompanying drawings. FIG. 1 is a perspective view schematically showing a state of measuring a machine accuracy of a B-axis rotating movement in a lathe having a tool post 3 which can rotate around a B axis by using a measuring device according to the invention. The tool post 3 in the drawing can move in directions of three axes of Z, X and Y, and is provided with a tool shaft 31 which can rotate around the B axis (around the Y-axis). A direction of a starting point (a B-axis starting point) of the rotating tool shaft 31 is the direction of X-axis. A reference sphere 2 is fixed to a member which is relatively immovable in relation to the tool post 3, for example, a headstock.

A controller 10 of the lathe includes a control portion 9 of the tool post 3. A measuring device according to an illustrated embodiment which is registered in the controller 10 of the lathe is provided with a main program 6 which stores an automatic measurement procedure including a switching means S, a first measurement program 4a, and a second measurement program 4b. The first measurement program 4a includes a first measurement plane moving step 5a, and the second measurement program 4b includes a second measurement plane moving step 5b.

The measurement program 4 is a program which measures the reference sphere 2 from five directions and detects a central coordinate thereof, and the measurement plane moving step 5 (5a, 5b) is a program which sets the measurement plane P of the five-axis measurement to a position where the reference sphere 2 and a lever rod 12 do not interfere. The first measurement program 4a and a central coordinate operation program 7a included in the program can employ the programs which have been conventionally used in the machining center as they are.

Figure 2:
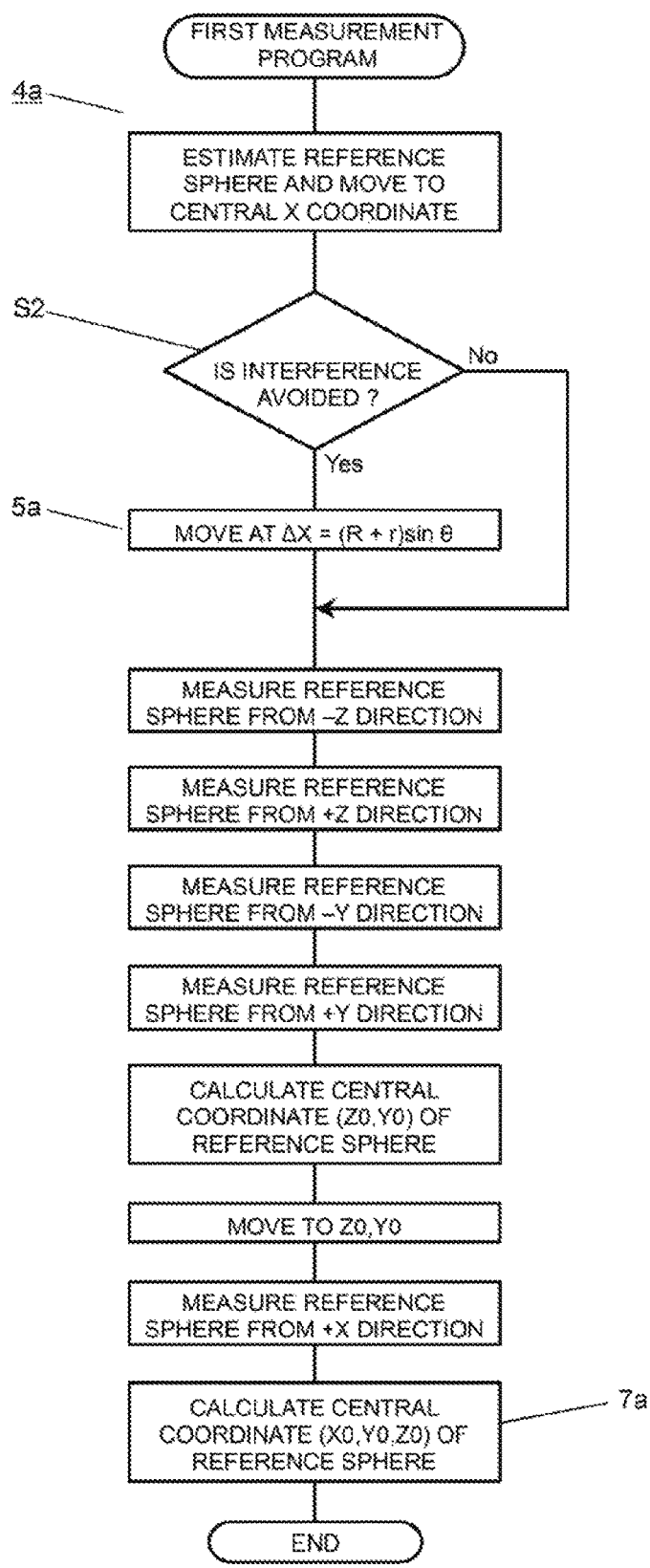
FIG. 2 is a flow chart of a first measuring means.
Figure 3:
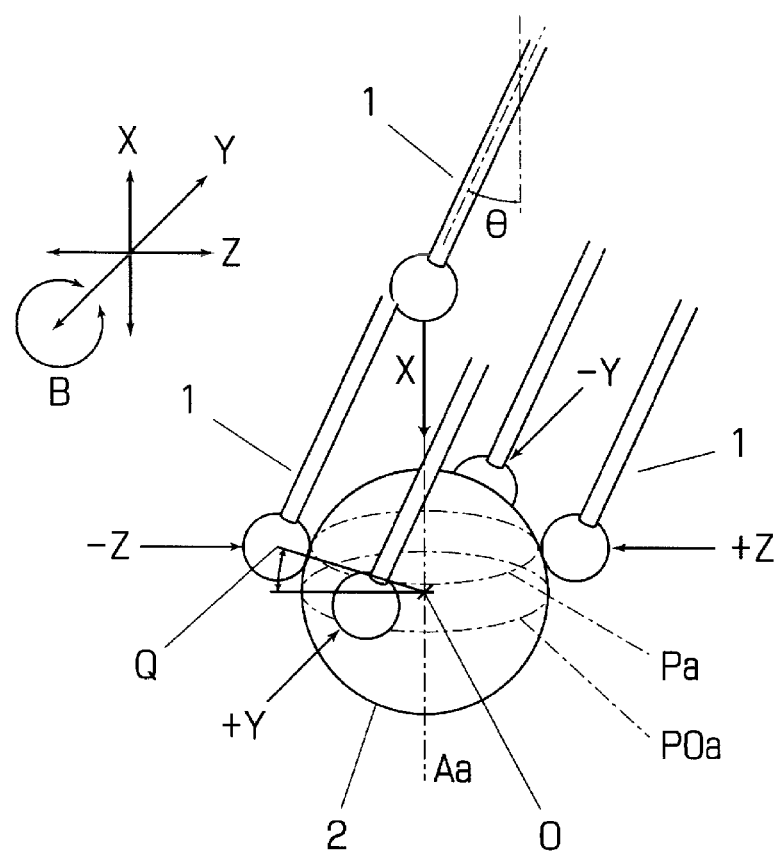
FIG. 3 is a perspective view showing a motion of the first measuring means.
Figure 9:
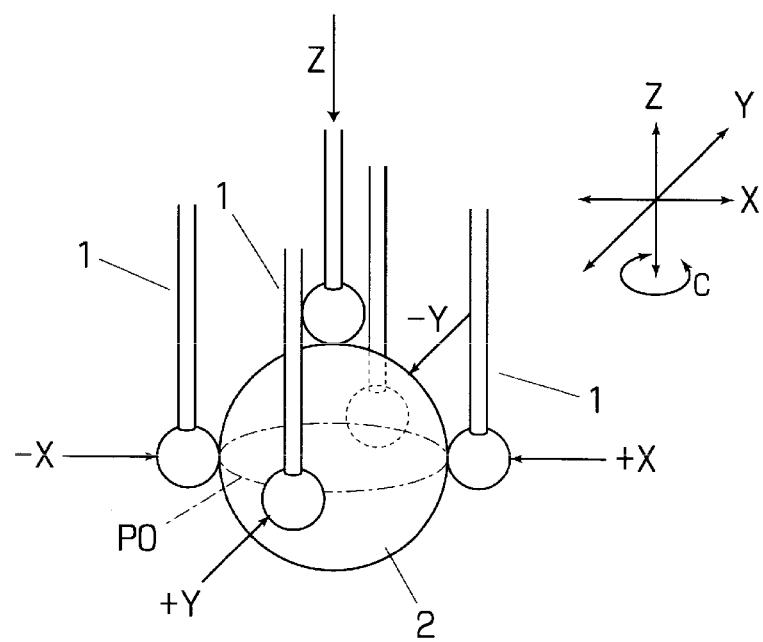
FIG. 9 is a perspective view showing a measuring motion in the case of FIG. 8.

FIGS. 2 and 3 are a flow chart of the first measurement program 4a and a view showing a measuring motion thereof. The first measurement program 4a is a program which carries out the same processes while setting the X, Y and Z axes in FIG. 9 described about the machining center to the Z, X and Y axes, and calculates a central coordinate (Z0, Y0)

on a Z-Y plane of the reference sphere 2 by measuring the reference sphere 2 from a −Z direction, next measuring from a +Z direction, next measuring from a −Y direction, and further measuring from a +Y direction. Next, the tool post 3 moves in such a manner that a tip sphere 11 is positioned in a calculated Z0, Y0 coordinate, and the reference 2 is detected by moving the tool post 3 in the −X direction. On the basis of results of measurement at five points mentioned above, the central coordinate (X0, Y0, Z0) of the reference sphere 2 is calculated according to the same operation 7a which has been used in the conventional five-axis measuring method.

Data of geometric shapes such as a radius r of the tip sphere 11 of the touch probe and a radius R of the reference sphere 2 are previously measured precisely and are registered in the controller 10. An angle of rotation around the B axis of the tool shaft 31 can be arithmetically operated according to a geometric operation by using a calculated central coordinate of the reference sphere and a measured coordinate of the tool post 3 acquired from the tool post control portion 9. Further, a machine error of the B-axis rotating movement can be measured on the basis of a difference between an angle as a result of the arithmetic operation and an angle commanded by the tool post control portion 9. The measuring motion of the first measurement program 4a is executed in the case that the angle of rotation of the B axis is in an angular range between −44.9 degrees and +44.9 degrees (refer to FIG. 7).

Figure 4:
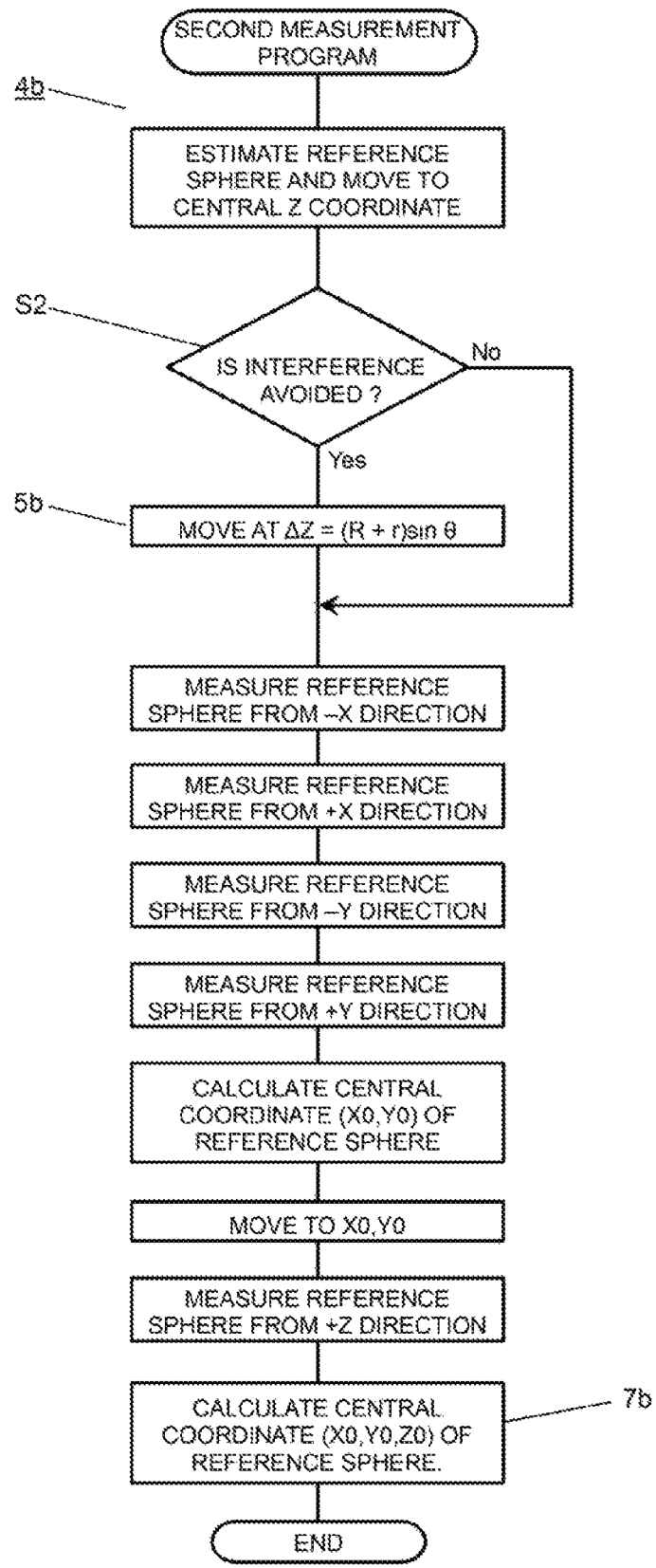
FIG. 4 is a flow chart of a second measuring means.
Figure 5:
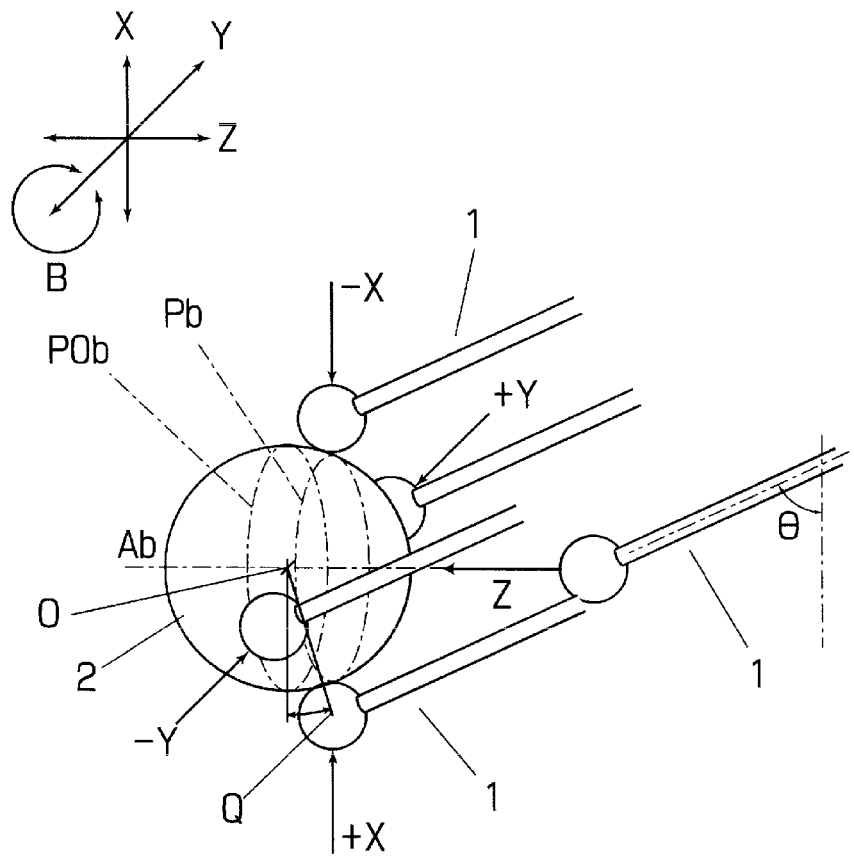
FIG. 5 is a perspective view showing a motion of the second measuring means.
Figure 6:
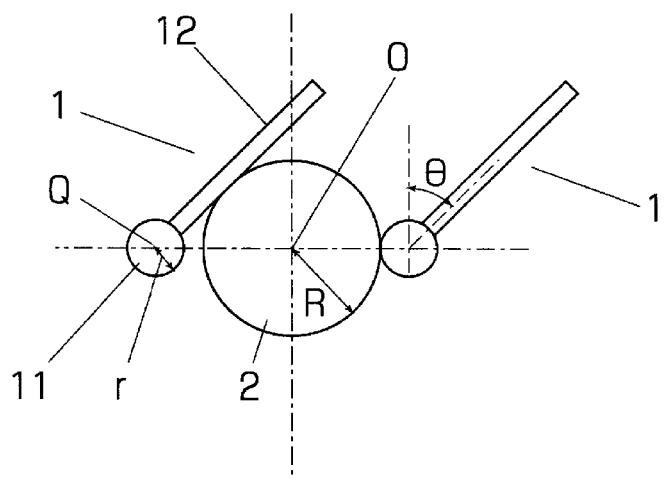
FIG. 6 is an explanatory view showing an immeasurable state.

FIGS. 4 and 5 are a flow chart of the second measurement program 4b and a view showing a measuring motion thereof. The second measurement program 4b is a program converting the Z-axis and the X-axis in the first measurement program 4a, and calculates the central coordinate (X0, Y0) on the X-Y plane of the reference sphere 2 by measuring the reference sphere 2 from the −X direction, next measuring from the +X direction, next measuring from the −Y direction and further measuring from the +Y direction. Next, the tool post 3 moves in such a manner that the tip sphere 11 is positioned at the calculated X0, Y0 coordinate, and the center of the reference sphere 2 is detected by moving the tool post 3 in the Z direction. On the basis of results of measurement at five points mentioned above, the central coordinate (X0, Y0, Z0) of the reference sphere 2 is calculated according to the same arithmetic operation 7b which is used in the conventional five-axis measuring method, and the angle of rotation around the B axis of the tool shaft 31 is arithmetically operated by using the central coordinate. The measuring motion of the second measurement program 4b is executed in the case that the angle of rotation of the B axis is in an angular range between −9-degrees and −45 degrees, and between +45 degrees and +90 degrees (refer to FIG. 7).

In the flow charts shown in FIGS. 2 and 4, a measurement plane moving operation can be executed for avoiding interference between the lever rod 12 of the touch probe and the reference sphere 2, before the measurement programs 4a and 4b are executed.

The measurement plane moving operation is structured, as shown in FIGS. 2 and 4, such that the measurement at four points on the measurement plane P is carried out at a position where a straight line connecting the center O of the reference sphere 2 and the center Q of the tip sphere 11 of the touch probe is perpendicular to the lever rod 12 of the touch probe, and is provided for preventing the lever rod 12 of the touch probe from interfering with the reference sphere 2 and being immeasurable in the case that the radius r of the tip sphere 11 of the touch probe is smaller than the radius R of the reference sphere 2.

In the conventional five-axis measuring method, the measurement is carried out by setting the plane in which the estimated center of the reference sphere 2 is included to the fixed reference measurement plane P0, however, if the angle θ of the lever rod 12 of the touch probe is deviated from the angle which is perpendicular to the reference measurement plane P0, the reference sphere 2 comes into contact with the lever rod 12 of the touch probe before the reference sphere 2 comes into contact with the tip sphere 11 of the touch probe, and the reference sphere may be incapable of being detected by the touch probe. In the case that the interference avoiding operation is commanded, the measurement plane moving step 5 is executed by branching at a determination step S2, and the measurement plane P is moved in the direction of the measurement axis A.

In a first measurement plane moving step 5a in FIG. 2 in the angular range where the B-axis angle of rotation is between −44.0 degrees and +44.9 degrees, the measurement plane Pa is set to a position where the tool post 3 moves in a direction that the tool post 3 moves away from the reference sphere 2, in the X-axis direction only at (R+r)sin θ from a plane P0a including the estimated center O of the reference sphere, and the measurement of −Z, +Z, −Y and +Y in the measurement procedure of the first measurement program 4a is carried out on the measurement plane Pa after movement.

Further, in the second measurement plane moving step 5b in FIG. 4 in the angular range where the B-axis angle of rotation is between −90 degrees and −45 degrees and between +45 degrees and +90 degrees, the measurement plane Pb is set to a position where the tool post 3 moves in a direction that the tool post 3 moves away from the reference sphere 2, in the Z-axis direction only at (R+r)sin θ from a plane P0b including the estimated center O of the reference sphere, and the measurement of −X, +X, −Y and +Y in the measurement procedure of the second measurement program 4b is carried out on the measurement plane Pb after movement.

Figure 7:
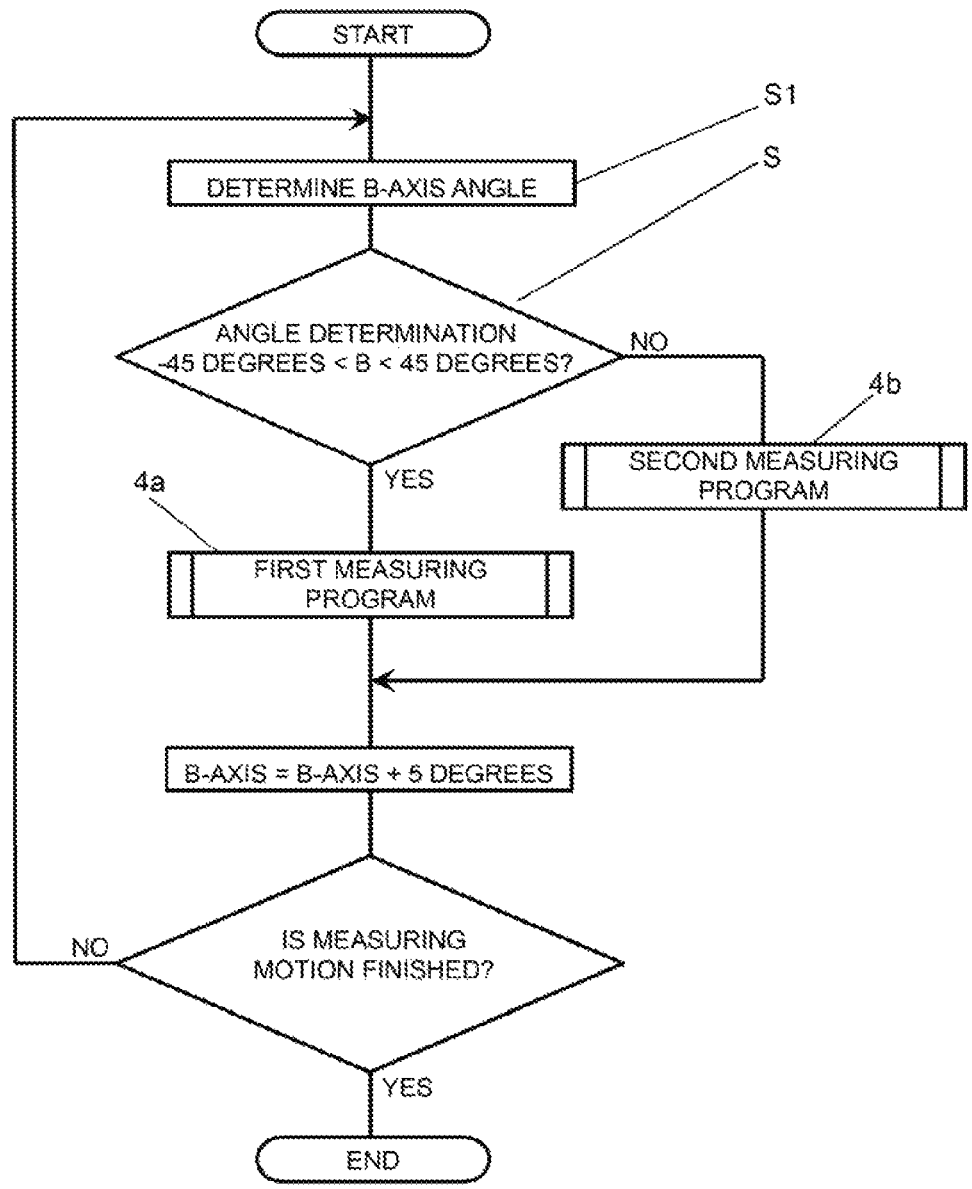
FIG. 7 is a flow chart showing an automatic measurement procedure.
Figure 8:
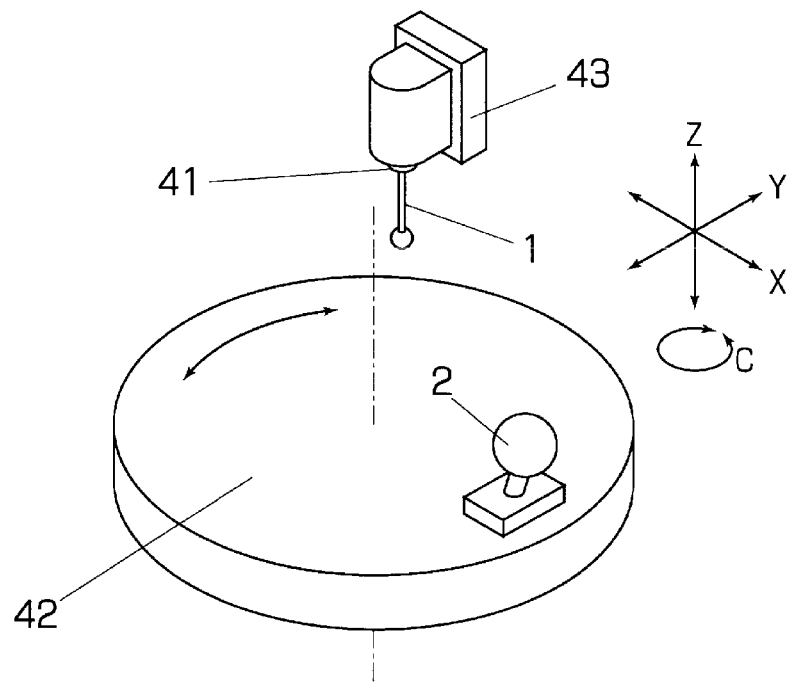
FIG. 8 is a perspective view schematically showing a state of measuring a machine accuracy of a B-axis rotating movement in a machining center.

Next, a description will be given of an automatic measurement procedure of a machine error in the B axis by means of the device according to the invention with reference to FIG. 7 showing a procedure of a main program 6. The program in FIG. 7 executes with designating the B axis to −90 degrees. When the procedure is executed, a step S1 determines the B axis to the designated angle, and a determining step S determines whether or not the angular range is in a range between −45 degrees and +45 degrees. If the angle is in the range, a procedure of the first measurement program 4a is executed, the central coordinate of the reference sphere 2 is detected, and the machine error at the B-axis angle is arithmetically operated. On the other hand, if the angular range is equal to or less than −45 degrees or equal to or more than +45 degrees, a procedure of the second measurement program 4b is executed, the center of the reference sphere 2 is determined, and the machine error of the B-axis rotating movement at the B-axis angle is arithmetically operated.

Since the B axis is designated to −90 degrees initially, the procedure of the second measurement program is executed, 5 degrees is added to the command value of the B axis and the measurement at the next angle is executed. There is repeated such a motion that the measurement at each of the angles is executed while selecting the first measurement program 4a and the second measurement program 4b in correspondence to the angular range every 5 degrees from −90 degrees as mentioned above. Since the measurement of the machine error is executed in the range between −90 degrees and +90 degrees, the measuring motion finish comes to YES at a time point that the command value obtained by adding 5 degrees comes to +95 degrees, and the automatic measurement is finished.

As can be understood from the above description, it is possible to accurately detect the center position of the reference sphere in the wide angular range according to the five-axis measurement method even in the case that the touch probe itself detecting the reference sphere rotates together with the rotating movement of the tool post which intends to measure the machine accuracy, and it is possible to measure the machine error of the angle of rotation at a high accuracy even in the machine tool in which the touch probe rotates according to the rotating motion intending to measure the machine error, such as the machine error in the B-axis rotating movement of the tool post in the composite lathe, by using the means which has been utilized in the machining center.

EXPLANATION OF LETTERS OR NUMERALS 1 touch probe
2 reference sphere
3 tool post
4a first measurement program
4b second measurement program
5 (5a, 5b) measurement plane moving program
11 tip sphere
12 lever rod
A (Aa, Ab) measurement axis
O center of reference sphere
P (Pa, Pb) measurement plane
P0 (P0a, P0b) plane
Q center of tip sphere
S switching means
R radius of reference sphere
R radius of tip sphere
θ angle of rotation

The invention claimed is:

1. A measuring method of a machine accuracy in a machine tool for measuring the machine accuracy by determining a central coordinate of a reference sphere installed at a predetermined position of a machine according to a five-axis geometrical error measuring method and setting the central coordinate to a reference,
wherein the method moves a measurement plane in a direction of a measurement axis in the five-axis geometrical error measuring method in correspondence to an angle of inclination in a touch probe which detects the reference sphere.

2. The measuring method of the machine accuracy according to claim 1, wherein the five-axis geometrical error measuring is carried out by moving the measurement plane in the direction of the measurement axis to a position where the lever rod of the touch probe is perpendicular to a line connecting an estimated center of said reference sphere and a center of a tip sphere of the touch probe when detecting the reference sphere.

3. A measuring device of a machine accuracy in a machine tool for measuring an accuracy of an angle of rotation of a tool post by detecting a reference sphere which is installed at a predetermined position by means of a touch probe installed to the rotatable tool post, the measuring device comprising:
a first measuring means which detects a center position of said reference sphere at an angular range near a rotating movement starting point angle or the tool post according to a five-axis geometrical error measuring method;
a second measuring means which detects the center position of said reference sphere according to the five-axis geometrical error measuring method by setting a plane including a first measurement axis which is orthogonal to a first measurement plane used in the first measuring means and one axis of the first measurement plane to a second measurement plane and setting an axis which is orthogonal to the second measurement plane to a second measurement axis;
a switching means which switches from the first measuring means to the second measuring means at a predetermined angle position of the angle of rotation in said tool post; and
a moving means for respectively moving the first measurement plane and the second measurement plane in directions of said first measurement axis and said second measurement axis in correspondence with a respective angle of inclination in the touch probe which detects the reference sphere.

4. The measuring device of the machine accuracy according to claim 3, wherein the moving means which moves said measurement plane in a direction of said measurement axis to a position where a lever rod of the touch probe does not come into contact with the reference sphere before a tip sphere of said touch probe comes into contact with the reference sphere.

5. The measuring device of the machine accuracy according to claim 4, wherein said tool post is a tool post which is rotatable around a B axis in a lathe.

6. The measuring device of the machine accuracy according to claim 3, further comprising a measurement plane moving means which sets said measurement plane to a plane which is moved at (R+r)sin θ in the direction of the measurement axis from a plane where the center of the reference sphere is estimated to be positioned, in which R is a radius of said reference sphere, r is a radius of the tip sphere of said touch probe, and θ is an angle of rotation of said tool post.

7. The measuring device of the machine accuracy according to claim 6, wherein said tool post is a tool post which is rotatable around a B axis in a lathe.

8. The measuring device of the machine accuracy according to claim 3, wherein said tool post is a tool post which is rotatable around a B axis in a lathe.

* * * * *